2,738,809
PRESSURE ACCUMULATOR CONSTRUCTION
Jean Mercier, New York, N. Y.

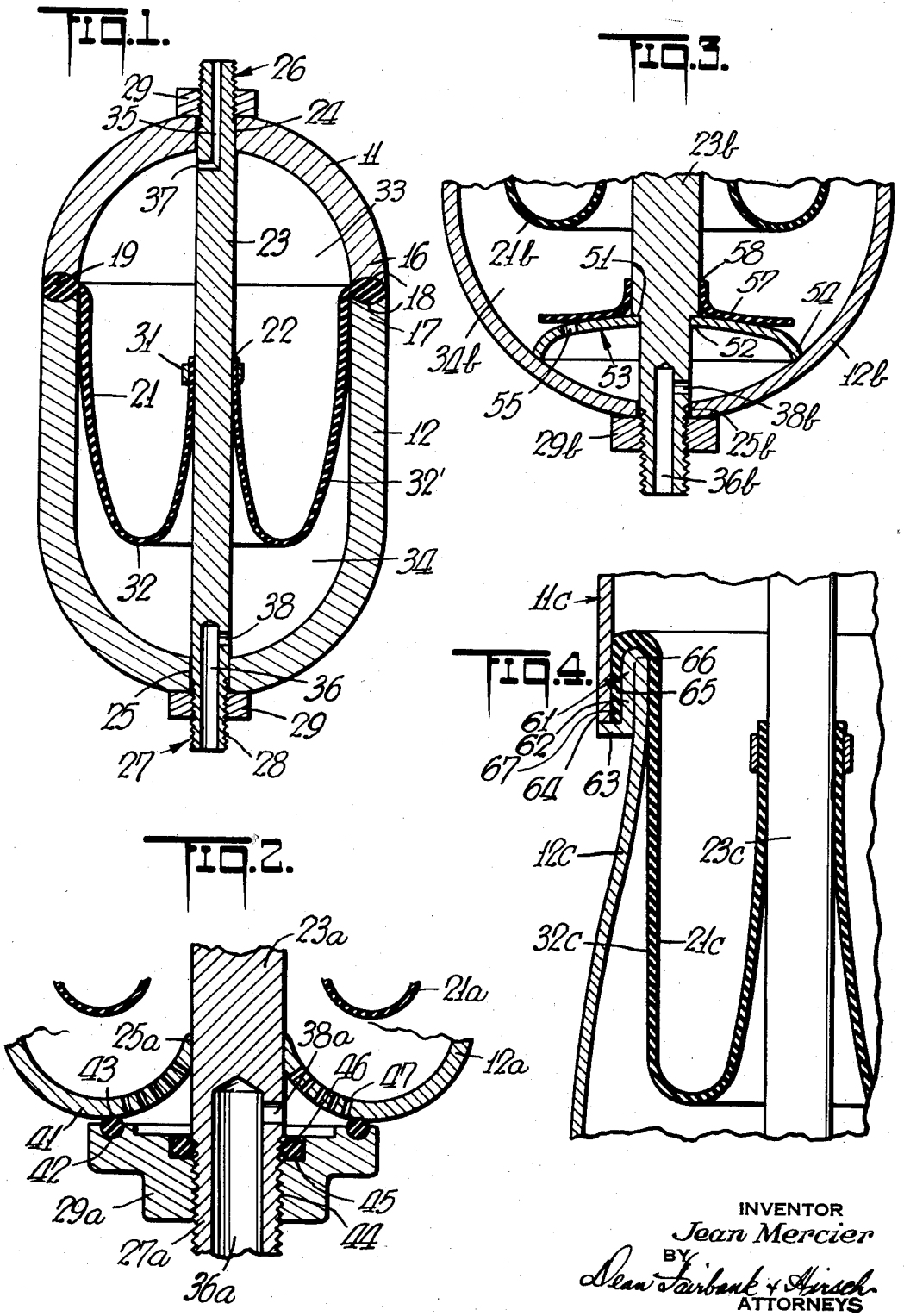
March 20, 1956 — J. MERCIER — 2,738,809
PRESSURE ACCUMULATOR CONSTRUCTION
Filed Dec. 10, 1952
INVENTOR
Jean Mercier

Application December 10, 1952, Serial No. 325,161

8 Claims. (Cl. 138—30)

This invention relates to pressure accumulators, more particularly of the type formed by two juxtaposed shells with a deformable partition therebetween.

It is among the objects of the invention to provide a pressure accumulator of the above type that has but few parts which may readily be fabricated from low cost materials and which may readily be assembled with the use of but few simple tools securely to retain the periphery of the deformable partition therebetween in fixed position without use of any special clamping means other than those required to hold the accumulator shells together.

According to the invention these objects are accomplished by the arrangement and combination of elements hereinafter described and particularly recited in the claims.

In the accompanying drawings in which are shown one or more of various possible embodiments of the several features of the invention, Fig. 1 is a longitudinal sectional view of the accumulator, Figs. 2, 3 and 4 are fragmentary longitudinal sectional views on a larger scale of other embodiments of the invention.

Referring to Fig. 1 of the drawings, the pressure accumulator desirably comprises a pair of cup-shaped, substantially cylindro-spherical shells 11 and 12 desirably having the same outer diameter, the shell 12 preferably being of greater length than the shell 11. Each of the rims 16, 17 of the shells 11 and 12 has an annular depression 18 therein between which the enlarged periphery or rim 19 of a deformable partition 21 may be positioned.

The partition 21 which desirably is of rubber, natural or synthetic, preferably is a circular disc of diameter considerably greater than the inner diameter of the shells 11 and 12 and has an axial opening 22 therethrough. The rims 16, 17 of the shells are desirably clamped against the enlarged periphery 19 of the partition 21 by means of a central rod 23 which extends longitudinally through the juxtaposed shells 11 and 12, through axial opening 22 in partition 21 and through axial openings 24 and 25 at the ends of the shells respectively. The protruding ends 26 and 27 of the rod 23 are desirably threaded as at 28 so that they may receive a nut 29, which when screwed upon such threaded ends and tightened will move the shells 11 and 12 together so that the rims 16, 17 thereof will press tightly against the enlarged rim 19, securely retaining the latter in place and providing a dependable seal between such rim portions of the shell.

The periphery of opening 22 in partition 21 is securely retained against the central rod 23 as by means of a suitable clamp 31. The dimensions of the partition 21 and the position at which the periphery of opening 22 thereof is clamped to the rod 23 are so selected that as shown in Fig. 1, the partition will hang downwardly in shell 12 to define a bladder that is substantially conical in cross section, the distance of the outer surface 32' of the partition from the inner wall of the shell progressively increasing from the enlarged rim 19 thereof to the reversely bent bottom 32 thereof.

Means are desirably provided to charge the chamber 33 of the accumulator on one side of the partition 21 with gas, for example, and the chamber 34 on the other side of the partition 21 with a liquid such as oil. For this purpose each of the ends 26, 27 of the central rod 23 desirably has a longitudinal bore 35, 36 therein defining a gas and oil port respectively, and a transverse bore 37, 38 leads from such longitudinal bore into the accumulator. Thus, a gas under pressure may be forced through bores 35 and 37 into the accumulator chamber 33 on one side of the partition and a liquid such as oil may be forced through the bores 36 and 38 into the accumulator chamber 34 on the other side of the partition. As the valve means controlling the gas inlet port 35 and the oil port 36 are conventional, they will not be shown.

In the operation of the accumulator shown in Fig. 1, gas under pressure is initially charged into the accumulator through port 35 and such port is thereupon sealed. Oil under pressure greater than that in the gas chamber 33 is forced through oil port 36 into liquid chamber 34. As the result, the partition 21 will be deformed and the gas in the chamber 33 will be compressed.

When the oil port 36 is opened in use of the accumulator the compressed gas in chamber 33 will cause the partition 21 to move outwardly thereby forcing oil through bores 38 and 36. As the partition 21 expands, the portion of the outer wall 32' thereof closest to the inner wall of shell 12 will first contact such shell and as more and more oil is forced from the accumulator, the wall of the partition will progressively engage such shell.

As a result, no oil pocket will be formed between the partition and the wall of the container and substantially all of the fluid in the container will be forced out therefrom. As the operation of the conical bladder above described is set forth in detail in Reissue Patent No. 23,437, dated December 4, 1951, it will not be further described.

In the embodiment of the accumulator shown in Fig. 2, which is substantially identical to that shown in Fig. 1, parts corresponding to those in the embodiment shown in Fig. 1 will have the same reference numerals with the letter "a." In this embodiment the periphery of the opening 25a at the end 41 of shell 12a is desirably inwardly bent. The nut 29a screwed on the end 27a of central rod 23a which extends through such opening, desirably has an annular groove 42 in the inner face thereof in which is positioned a suitable resilient sealing ring 43, preferably of rubber, which, when the nut is tightened will press against the reversely bent end 41 of the shell 12a to effect a liquid tight seal. The bore 44 of nut 29a is desirably of enlarged diameter at the inner end thereof defining an annular seat 45 in which a second sealing ring 46 is positioned. Thus, by reason of the seals 43 and 46, none of the fluid forced through the plurality of bores 47 in the inturned periphery of shell 12a by the expanding partition 21a will leak out of the unit, but all of such fluid will be forced through bores 38a and 36a to the equipment to be operated.

In the embodiment shown in Fig. 3 which is substantially identical to that shown in Fig. 1, in which parts corresponding to those in Fig. 1 have the same reference numerals with the letter "b," the end of central rod 23b extending through opening 25b in shell 12b is desirably of reduced diameter forming an annular shoulder 51 in shell 12b. The reduced portion of rod 23b extends through an axial opening 52 in a dish-shaped outlet plate 53, the rim 54 of which is seated against the inner surface of shell 12b with the concavity of such plate being directly opposed to such shell.

Thus, when the nut 29b is tightened to retain the accumulator in assembled state, the shoulder 51 will securely clamp the plate 53 against the shell. The plate 53 desirably has a plurality of openings 55 therethrough which provide passageways for fluid from the liquid chamber 34b of the accumulator to the inlet bore 38b of the oil port 36b. The openings 55 are desirably controlled by a flexible disc 57, preferably of rubber, having an axial opening 58 through which the central rod 23b extends, the periphery of such opening being bonded to such rod in such position that the disc will extend over the openings 55 being normally spaced therefrom.

In the operation of the accumulator, as the partition 21b is distended, oil will be forced through the openings 55 and ports 38b and 36b. By reason of the fact that the pressure on both sides of the disc 57 is the same, the latter will remain spaced from the openings 55 and it is not until the distended partition presses against such disc 53 and forces the latter against the openings 55 that the latter will be closed to stop further discharge of oil from the accumulator and preventing extrusion of such partition through the openings 55.

In the embodiment shown in Fig. 4 which is identical in many respects to the embodiment of Fig. 1, parts corresponding to those in Fig. 1 will have the same reference numerals with the letter "c." In this embodiment, the rim 61 of shell 12c is reversely bent as at 62 and the reversely bent portion 62 desirably has an annular lip 63 extending laterally outward from the end of portion 62.

The outer diameter of said reversely bent portion 62 is slightly less than the inner diameter of shell 11c so that it may readily fit therein.

In assembling the accumulator, the rim 64 of the shell 11c is positioned against the annular lip 63 as shown in Fig. 4 and the portion 65 of the partition 21c adjacent the rim 67 thereof is bent over the rounded junction 66 between reversely bent portion 62 and the adjacent portion of shell 12c.

The thickness of the portion 65 of the partition 12c is greater than the difference between the outer diameter of reversely bent portion 62 and the inner diameter of shell 11c so that when the two shells 11c and 12c are pressed together by the tightening of the nuts (not shown) at each end of the central rod 23c until rim 64 of shell 11c abuts against annular lip 63, the shell 11c will tightly clamp the portion 65 of the partition against the reversely bent portion 62 to provide a liquid and air tight shell which will prevent leakage from the accumulator. Desirably, the wall of shell 12c flares outwardly as shown and the wall 32c of partition 21c defines a substantially cylindrical bladder, which construction will also cause progressive engagement of the partition with the shell to insure complete expulsion of oil from the accumulator and avoidance of any oil pockets therein.

It is of course to be understood that the shells 12, 12a, and 12b of Figs. 1, 2 and 3 could flare outwardly as shown in Fig. 4 and the partitions 21, 21a and 21b could be cylindrical and the shell 12c of Fig. 4 could be cylindrical and the partition 21c conical to provide progressive engagement of the partition with the associated shell.

With the constructions above described, a highly efficient pressure accumulator may be formed which has but few relatively inexpensive parts which may be readily fabricated at low cost and which may readily be assembled into a complete unit.

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A pressure accumulator comprising a pair of substantially cup-shaped shells each having an axial opening through the end thereof, the diameter of the rim of the mouth of each of said shells being substantially identical, said shells defining a container when in juxtaposition, a flexible partition positioned in said container and having an axial opening therethrough, the outer periphery of said partition being adapted to be positioned between the rims of the mouths of said shells, a rod extending through the axial opening in said partition and through the openings in said shells and protruding from the latter, means on the protruding ends of said rod to retain the rims of the shells in juxtaposition to clamp the outer periphery of the partition therebetween, means securely to retain the periphery of the axial opening in said partition against said rod, and a gas and liquid port leading into said accumulator to charge the latter.

2. The combination set forth in claim 1 in which the partition has a diameter considerably greater than the diameter of said shells so that when the periphery of said partition is clamped between the rims of said shells and the periphery of the axial opening in said partition is affixed to said rod, the partition will hang in said accumulator.

3. The combination set forth in claim 2 in which the partition hanging in said accumulator defines a bag which is substantially conical in cross section.

4. A pressure accumulator comprising a pair of substantially cup-shaped shells each having an axial opening through the end thereof, the periphery of the axial opening in one of the shells being inwardly bent, said inwardly bent periphery having a plurality of bores therethrough for passage of liquid, a flexible partition having an axial opening therethrough, a rod extending through the opening in said partition and through the openings in said shells and protruding from the latter, said protruding ends of said rod being threaded, a nut screwed on said threaded protruding ends to move the rims of said shells toward each other to clamp the other periphery of the partition therebetween, the inner face of the nut adjacent the inwardly bent periphery of the shell desirably having an annular seal ring which engages the outer surface of the shell when the nut is tightened to provide a seal, means securely to retain the periphery of the axial opening in said partition against said rod and a gas and liquid port leading into said accumulator for charging thereof, said inwardly bent periphery having the bores therethrough being positioned between said liquid port and said partition.

5. A pressure accumulator comprising a pair of substantially cup-shaped shells each having an axial opening through the end thereof, a flexible partition having an axial opening therethrough, a rod extending through the opening in said partition and through the openings in said shell and protruding from the latter, one of said protruding ends of said rod being of reduced diameter defining an annular shoulder on said rod in said accumulator, a disc-shaped outlet plate in said accumulator having an axial opening through which the reduced end of said rod extends, and having an opening therethrough spaced from said axial opening, the opening in said plate spaced from said axial opening being for passage of liquid, the periphery of said axial opening seating against said annular shoulder and the rim of said plate seating on the inner wall of the adjacent accumulator shell, means on the protruding ends of said rod to move the shells toward each other so that the rims thereof will clamp the outer periphery of the partition therebetween, means securely to retain the periphery of the axial opening in said partition against said rod, a gas and liquid port leading into said accumulator for charging thereof, and a valve associated with the opening in said disc-shaped plate to close the latter when the partition abuts against said valve, said outlet plate having the spaced opening therein being positioned between said liquid port and said partition.

6. The combination set forth in claim 5 in which said valve comprises a flexible disc of resilient material positioned on the inner side of said disc-shaped plate and having an axial opening through which said rod extends, the periphery of said opening being affixed to said rod and the outer periphery of said disc extending over the opening in said plate and being normally spaced therefrom.

7. A pressure accumulator comprising a pair of substantially cup-shaped shells each having an axial opening through the end thereof, the rim of one of said shells being reversely bent and having an annular lip extending laterally outward from the end thereof, the outer diameter of said reversely bent portion being slightly less than the inner diameter of the rim of the second shell so that it may be encompassed thereby, a flexible partition positioned in the first shell and having an axial opening therethrough, the rim of said partition being positioned between the reversely bent portion and the rim of the encompassing shell and being of greater thickness than the space between said reversely bent portion and said rim, a rod extending through the axial opening in said partition and through the openings in said shells and protruding from the latter, means on the protruding ends of said rod to move the shells toward each other so that the rim of the second shell will be forced against the annular lip securely to clamp the rim of said partition between the reversely bent portion of the first shell and the portion of the second shell adjacent its rim, means securely to retain the periphery of the axial opening in said partition against said rod and a gas and liquid port leading into the accumulator for charging thereof.

8. A pressure accumulator comprising a plurality of members defining a container therebetween when in juxtaposition, said members having at least two adjacent rims, and the portion of said members at the ends of the container each having an opening axially aligned with said container, a flexible partition positioned in said container and having an axial opening therethrough, said partition defining a chamber on each side thereof, means on the periphery of said partition positioned between two of said adjacent rims, a rod extending through the axial opening in said partition and through the openings in the portion of said members at the ends of said container and protruding from the latter, means on the protruding ends of said rod to retain said members in juxtaposition and to retain the periphery of said partition fixed with respect to two of said adjacent rims, means securely to retain the periphery of the axial opening in said partition against said rod and a gas and liquid port leading into the respective chambers in said accumulator to charge such chambers.

References Cited in the file of this patent

UNITED STATES PATENTS

| | | |
|---|---|---|
| Re. 23,437 | Mercier | Dec. 4, 1951 |
| 2,317,395 | Mercier | Apr. 27, 1943 |
| 2,371,632 | Lippincott | Mar. 20, 1945 |
| 2,394,401 | Overbeke | Feb. 5, 1946 |
| 2,501,773 | Johnson | Mar. 28, 1950 |